United States Patent [19]
Buck et al.

[11] Patent Number: 5,954,347
[45] Date of Patent: *Sep. 21, 1999

[54] TOOL HOLDER AND TOOL FOR DRILLING AND STRIKING MACHINE TOOL

[75] Inventors: Manfred Buck, Nuertingen; Siegfried Fehrle, Leinfelden-Echterdingen; Bernd Koelle, Muelacker, all of Germany

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/915,942

[22] Filed: Aug. 21, 1997

Related U.S. Application Data

[63] Continuation of application No. 08/669,885, Jun. 20, 1996, abandoned.

[30] Foreign Application Priority Data

Jun. 20, 1995 [DE] Germany ............................ 195 21 993

[51] Int. Cl.⁶ ........................... B23B 31/22; B23B 51/06; B23C 5/28
[52] U.S. Cl. ................................. 279/20; 279/75; 279/82; 279/905; 408/57; 409/136; 409/234
[58] Field of Search ................................. 279/20, 74, 75, 279/82, 103, 157, 904, 905; 408/57, 59; 409/136, 234

[56] References Cited

U.S. PATENT DOCUMENTS

| | | | |
|---|---|---|---|
| 3,405,950 | 10/1968 | Cox | 279/103 |
| 4,080,090 | 3/1978 | Kern | 279/20 |
| 4,824,298 | 4/1989 | Lippacher et al. | 279/905 |
| 5,000,631 | 3/1991 | Deutschenbaur et al. | |
| 5,709,393 | 1/1998 | Von Keudell et al. | 279/82 |

FOREIGN PATENT DOCUMENTS

| | | | |
|---|---|---|---|
| 0175088 | 3/1986 | European Pat. Off. | |
| 3916315 | 11/1990 | Germany | 409/234 |

*Primary Examiner*—Steven C. Bishop
*Attorney, Agent, or Firm*—Michael J. Striker

[57] ABSTRACT

A tool holder and an associated tool with the shank are provided for a drilling and/or striking machine tool. The tool holder has a drive spindle with a receiving opening provided with a cone for centering and a portion for driving the tool. Dumbbell-shaped locking elements are guided with their inner ends in a passage and with their outer ends in a longitudinal groove. The outer ends engage in pockets in an axially displacable locking sleeve which is prestressed by a spring in the direction toward its locking position.

11 Claims, 2 Drawing Sheets

TOOL HOLDER AND TOOL FOR DRILLING AND STRIKING MACHINE TOOL

This application is a continuation of application Ser. No. 08/669,885, filed Jun. 20, 1996, now abandoned.

BACKGROUND OF THE INVENTION

The present invention relates to a tool holder and a tool for a drilling and/or striking machine tool.

Tool holder and tools of this general type are known in the art. For example, the European Patent Document EP 175 088 A1 discloses a tool holder with a tool which has inside a receiving opening for a shank of the tool with axial driving strips for a rotary driving, and the driving strips engage in corresponding driving grooves in the shank when the tool is inserted in the tool holder.

Since the receiving part of the machine has the driving strips, it must be produced by relatively expensive manufacturing processes, such as for example, forging, extrusion molding, round kneading. The centering cone at the machine must be machined later in a complicated manner. The centering cone at the tool is machined by turning or grinding. However, a coincidence error or offset can occur between the machined and the preformed surfaces, which can lead to an inaccurate sitting of the insertion tool in the tool receptacle.

SUMMARY OF THE INVENTION

Accordingly, it is an object of the present invention to provide a tool holder and a tool which avoid the disadvantages of the prior art.

More particularly, it is an object of the present invention to provide a tool holder and a tool which can be manufactured in a simpler and more accurate manner.

In keeping with these objects and with others which will become apparent hereinafter, one feature of the present invention resides, briefly stated, in a tool holder in which means for rotary driving is formed as a portion which preceds or follows the cone in the receiving opening and which extends parallel to a longitudinal axis of the tool holder and forms an inner polygonal formation.

In accordance with another feature of the present invention, a tool is proposed in which before or after the insertion; a driving region is arranged parallel to the longitudinal axis and is formed as a polygonal formation for driving the shank.

When the tool holder and the tool are designed in accordance with these features of the present invention, they provide for the above mentioned advantages.

In accordance with still a further feature of the present invention, the tool holder has at least one locking element which is formed at its end with a bead or a ball, and the ends are connected by a web with a reduced cross-section. With this construction, the tool holder provides an operationally reliable automatic locking which is formed of several components.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
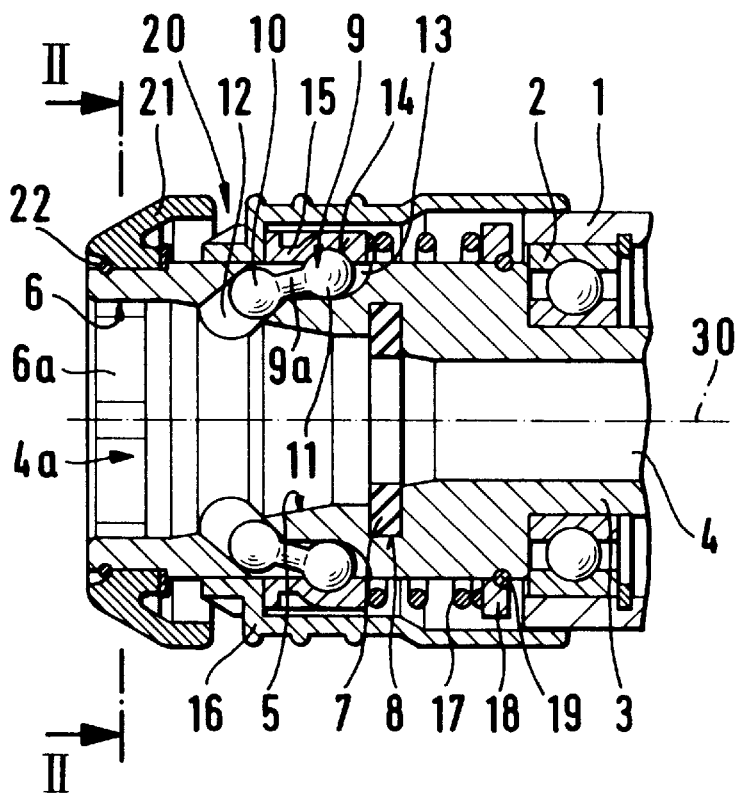
FIG. 1 is a view showing a longitudinal section of the tool holder in accordance with the present invention.

FIG. 1 shows a transmission housing of a drilling device, in particular for a diamond core drilling. The transmission housing is identified with reference numeral 1, and a drive spindle 3 is supported in the housing rotatably relative to it and extends outwardly beyond the housing. The drive spindle is supported for example, in a bearing 2 and driven in rotation by a not shown drive motor of the drilling device.

The drive spindle 3 has a central bore 4 for supply of a rinsing or cooling medium, or for insertion of a not shown anvil of a striking mechanism. The bore 4 expands toward the receiving opening 4a at its end which faces the tool. The receiving opening 4a is a part of a tool holder for an insertion tool 23.

The receiving opening 4a has a cone 5 which expands toward the end of the drive spindle 3 at the side of the tool. The cone 5 serves for centering of the insertion tool 23. The cone angle is of such a magnitude that no self locking can occur.

Figure 2:
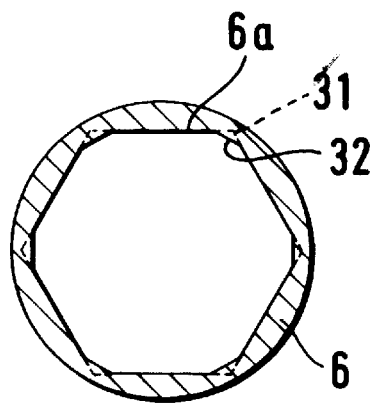
FIG. 2 is a view showing a cross-section through a drive spindle, taken along the line II—II in FIG. 1.

The receiving opening 4a has a portion 6 preceding the cone 5, the tool side and formed for receiving the tool 23. The portion 6 is axis-parallel to the longitudinal axis 30 of the drive spindle 3 and carries a polygonal formation 6a. The polygonal formation 6a can be formed, for example, as a polygon or a wedge-shaft profile. Preferably, the inner polygonal formation 6a, as shown in FIG. 2, is formed with an imaginary hexagonal base profile 31, but with inclined edges 32.

A circumferential recess 8 is provided after the cone 5 in the receiving opening 4a at the machine side. A sealing element 7 is located in the recess. The sealing element 7 seals the cone 5 from penetration of rinsing or cooling medium. Furthermore, because of the elasticity of the sealing element 7 and therefore its restoring force, the loosening of a tool 23 held on the cone 5 is facilitated.

At least one locking element 9 or preferably two or three elements 9 are provided for axial locking of the insertion tool 23 from falling out. The locking elements 9 are arranged in a passage 12 which extends radially and inclinedly to the longitudinal axis 30 through the drive spindle 3. A radial inwardly located end 10 of the locking element 9 is guided in the associated passage 12 and can engage radially into the receiving opening 4a. A radially outwardly located end 11 of the locking element 9 is axially displacably supported in an open longitudinal groove formed in the extension of the passage 12 in the drive spindle 3. The ends 11 of the locking element are held in the longitudinal grooves 13 by an axially displaceable locking sleeve 15 which surrounds the drive spindle 3.

The end 10, 11 of the locking element 9 are formed as beads or balls. A web 9a is located between the end 10 and 11 and is narrower than the end. The locking element 9, therefore, has the shape of a dumb-bell. In accordance with another embodiment, the lockings element 9 can be provided with two cylindrical pins which extends tangentially to the receiving opening 9 and are connected with another by a web.

The outer ends 11 of the locking elements 9 are inserted in pockets 14 in the locking sleeve 15. Therefore the ends 11 are displaced in the longitudinal grooves 13 during an axial displacement of the locking sleeve 15 so that the other ends 10 are located more or less deep in the passages 12. Since the web 9a has a narrowing cross-section, the locking element 9 can tilt correspondingly. In FIG. 1 the tool holder is shown in an unlocking position.

The spring 17 loads the locking sleeve 15 in direction toward its locking position. The spring 17 abuts at the side of the machine against the supporting disc 18 which is held by a safety ring 19 on the drive spindle 3. The locking sleeve 15 is displaceable via an actuating sleeve 16 opposite to the force of the spring 17. The locking sleeve 15 can be supported axially forwardly via the actuating sleeve 16 against a protective cap 21 which is secured in direction toward the tool 23 by the spring ring 22.

Figure 3:
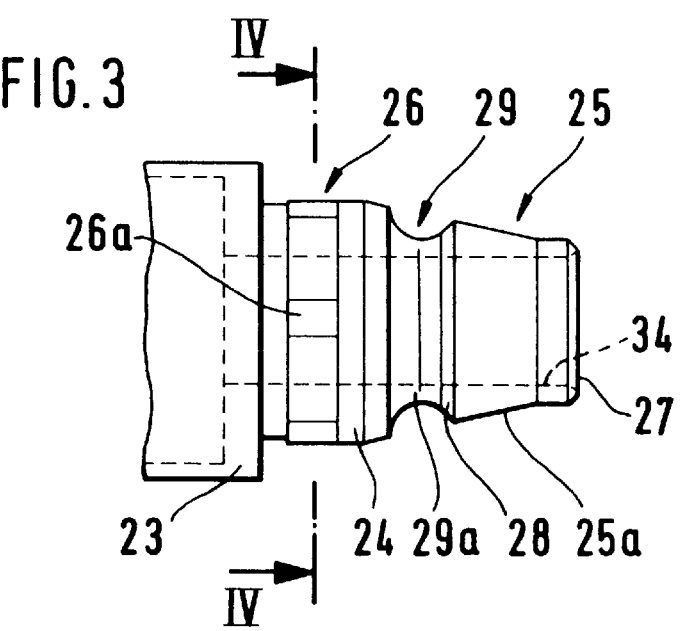
FIG. 3 is a view showing a shank of a tool in accordance with the present invention.
Figure 4:
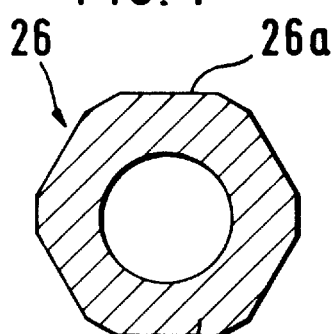
FIG. 4 is a view showing a section through the shank taken along the line IV—IV in FIG. 3.

FIG. 3 shows in detail a shank 24 of the tool 23. A centering region 25 is formed as a cone 25a in correspondence with the cone 5. The centering region 25 serves for a centered sitting of the tool 23 in the receiving opening 4a. A driving region 26 is provided behind the centering region for driving the tool 23. It corresponds to the portion 6 of the receiving opening 4a and is formed correspondingly as an outer polygon 26a as shown in FIG. 4. The inner polygon 6a together with the outer polygon 26a form a means 20 for driving the tool 23. Furthermore, a locking region 29 is further provided and has a recess 29a formed as a ring groove. The tool 23 is provided with flow passages 34 shown in FIG. 3 in a broken line and use for rinsing or cooling medium.

The locking of the tool 23 in the tool holder is performed in the following manner:

The shank 24 is inserted in the receiving opening 4a until the shaft end 27 abuts against the end 10 of the locking element 9 in the receiving opening 4a. During a further insertion, the ends 10 are pressed in the passages 12, and the other ends 11 of the locking elements 9 displace the locking sleeve 15 back against the force of the spring 17 so that it can deviate axially.

When the shank 24 is sufficiently introduced into receiving opening 4a, the locking elements 9 can snap back into the recess 29a. The passages 12 are inclined, so that in connection with an incline 28 at the machine-side edge of the recess 29a, a resulting force is produced in the direction toward the machine and brings the cone surfaces 5 and 25a to abutment against one another.

Figure 5:
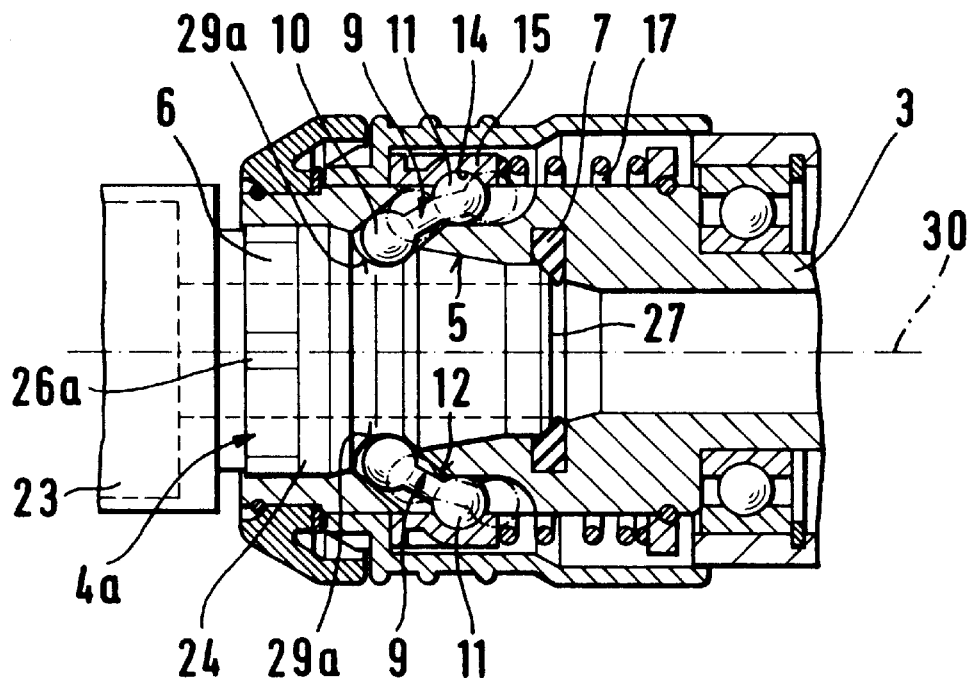
FIG. 5 is a view showing a section through a tool holder with a tool shaft inserted in it, in accordance with the present invention.

In FIG. 5 the shank 24 is shown in its position in which it is locked in the receiving opening 4a. The end 10 of the locking elements 9 engages in the recess 29a. The locking sleeve 15 is located in the locking position. The shaft end 27 comes to abutment against the sealing element 7 and elastically deforms it.

For releasing the tool 23 from the drive spindle 3, the actuating sleeve 16 is displaced with the locking sleeve 15 rearwardly against the spring 17 as shown in FIG. 1. Thereby the ends 10 of the locking elements 9 are pulled back into the passages 12. The tool 23 can be withdrawn from the receiving opening 4a.

Figure 6:
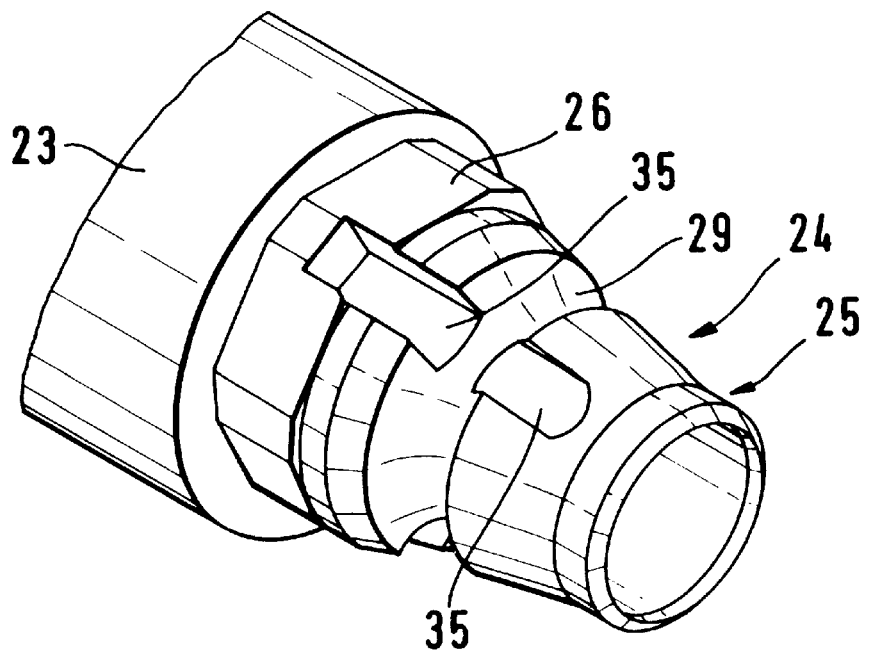
FIG. 6 is a view showing a shank of the tool in a perspective.

FIG. 6 shows an advantageous further embodiment of the shank 24. The only difference of this embodiment from the embodiment of FIG. 3 is that at least one driving groove 35 is provided in the region of the cone 25a. Therefore the shank 24 can be insertable selectably into commercially different tool holders with corresponding driving strips.

The present invention is not limited to the shown embodiment. It is recommended, for example, to arrange the passages 12 in the drive spindle 3 inclinedly in the circumferential direction, and correspondingly to make the locking sleeve 13 rotatable. In connection with the spring 17 formed as a rotary spring, a tool holder can be also provided with a rotary locking. Instead of the circumferential ring groove, several individual depressions can be provided in the shank 24. The means 24 for driving can be formed at both sides of the cone 5 or the centering region 25, or in other words, also at the machine side in the receiving opening 4a and at the end side on the shank 24. In order to simplify the manufacture, its arrangement outside the conical centering surfaces (in other words, the cone 5 and centering region 25) is very advantageous. The locking region 29 and the passages 12 must be arranged in the region of the conical centering surfaces 5 and 25.

It will be understood that each of the elements described above, or two or more together, may also find a useful application in other types of constructions differing from the types described above.

While the invention has been illustrated and described in a tool holder and a tool for drilling and/or striking machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims:

1. A tool holder for a machine tool, comprising a drive spindle provided with a receiving opening for a shank of a tool, said receiving opening being formed partially as an outwardly expanding cone; at least one locking body for an axial locking of the shank inserted in said receiving opening; means for rotary driving of the shank inserted in said receiving opening, said means being formed as a portion which is offset from said cone in said receiving opening, said portion extending axis-parallel to a longitudinal axis of said drive spindle and being formed as a polygonal formation, said tool holder having a central opening for a cooling or rinsing medium, said receiving opening having a machine side provided with a circumferential recess; a sealing element arranged in said circumferential recess so as to provide an end axial abutment for a shaft end of the shank inserted in said receiving opening.

2. A tool holder as defined in claim 1, wherein said portion is located after the said cone in an axial direction.

3. A tool holder as defined in claim 1, wherein said portion has a hexagonal ground profile with rounded edges.

4. A tool holder as defined in claim 1, wherein said portion has an inner wedge-shaft profile.

5. A tool holder for a tool, comprising a drive spindle provided with a receiving opening for a shank of a tool to be inserted in the tool holder; at least one locking element for axially locking the shaft in said receiving opening, said locking element having a radially inner end and a radially outer end, said drive spindle having a passage through which said radially inner end of said locking element engages into said receiving opening; a locking sleeve arranged on said drive spindle and holding said radially outer end, said at least one locking element having two ends provided with a thickening and a web having a reduced cross-section and connecting said thickenings with one another.

6. A tool holder as defined in claim 5, wherein said thickenings are formed as beads.

7. A tool holder as defined in claim 5, wherein said thickenings are formed as balls.

8. A tool holder as defined in claim 5, wherein said passage is inclined and opens outwardly in a radially opened groove, said locking sleeve having a pocket, said inner end of said locking element being guided in said passage while said outer end of said locking element engaging into said pocket in said locking sleeve and also being displaceably guided in said groove.

9. A tool holder as defined in claim 8, wherein said passage is inclined axially inwardly and said groove is formed as an axial groove, said locking sleeve being axially displaceable.

10. A tool holder as defined in claim 5; and further comprising a spring arranged so that said locking sleeve is loaded in a direction toward a locking position by a force of said spring.

11. A machine tool, comprising a tool; and a tool holder for holding said tool, said tool holder including a drive spindle provided with a receiving opening for a shank of said tool to be inserted in the tool holder; at least one locking element for axially locking the shaft in said receiving opening, said locking element having a radially inner end and a radially outer end, said drive spindle having a passage through which said radially inner end of said locking element engages into said receiving opening, a locking sleeve arranged on said drive spindle and holding said radially outer end, said at least one locking element having two ends provided with a thickening and a web having a reduced cross-section and connecting said thickenings with one another.

* * * * *